US008539445B2

(12) United States Patent
Gangemi et al.

(10) Patent No.: US 8,539,445 B2
(45) Date of Patent: Sep. 17, 2013

(54) METHOD FOR GENERATING A ROBUST SOFTWARE SIGNATURE

(75) Inventors: Rosario Gangemi, Lavinio-Rome (IT); Luigi Pichetti, Rome (IT); Alessandro Terenzi, Ceccano (IT); Alessandro Capomassi, Rome (IT); Marcello Vitaletti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 12/193,556

(22) Filed: Aug. 18, 2008

(65) Prior Publication Data

US 2009/0248636 A1 Oct. 1, 2009

(30) Foreign Application Priority Data

Apr. 20, 2006 (EP) .................................... 06112793
Feb. 1, 2007 (WO) ................. PCT/EP2007/050974

(51) Int. Cl.
*G06F 9/44* (2006.01)
(52) U.S. Cl.
USPC ......................................................... 717/120
(58) Field of Classification Search
USPC ......................................................... 717/120
See application file for complete search history.

(56) References Cited

U.S. PATENT DOCUMENTS

| 6,366,930 | B1 | 4/2002 | Parker et al. |
| 6,389,433 | B1* | 5/2002 | Bolosky et al. ............... 707/749 |
| 2004/0236843 | A1* | 11/2004 | Wing et al. .................... 709/219 |
| 2005/0044541 | A1* | 2/2005 | Parthasarathy et al. ....... 717/173 |
| 2006/0075128 | A1* | 4/2006 | Kotler et al. .................. 709/229 |

FOREIGN PATENT DOCUMENTS

| WO | 01/53938 A1 | 7/2001 |
| WO | WO 0205184 A2 * | 1/2002 |
| WO | WO0205184 A3 | 1/2002 |
| WO | WO 2007122021 A1 | 11/2007 |

* cited by examiner

*Primary Examiner* — Li B Zhen
*Assistant Examiner* — Bradford Wheaton
(74) *Attorney, Agent, or Firm* — Brevetto Law Group

(57) ABSTRACT

A method and a corresponding system and computer-usable medium for discovering software products on a plurality of one or more computers. The discovering method, system and/or computer-usable medium can populate a software catalogue without the manual intervention of an administrator. Such an approach reduces the cost of producing and maintaining a comprehensive knowledge base (e.g., the catalogue), which contains definitions of software products and the related signature. Signature definitions combine information obtained by the data gathering process and information contained in the registries. This combination allows the creation of a robust signature which reduces to a great extent the possibilities of both "false positive" and "false negative" results.

20 Claims, 4 Drawing Sheets

METHOD FOR GENERATING A ROBUST SOFTWARE SIGNATURE

PRIORITY TO RELATED PATENT APPLICATION

This patent application is a 35 USC §371 National Stage Application that claims priority to International Patent Application No. PCT/EP2007/050974, entitled "A Method for Generating a Robust Software Signature," which was filed under the Patent Cooperation Treaty (PCT) on Feb. 1, 2007, and in turn claims priority to European Patent Application No. 06112793.2 filed with the European Patent Office on Apr. 20, 2006, said applications expressly incorporated herein by reference in their entireties.

TECHNICAL FIELD

The present invention relates to the data processing field. More specifically, the present invention relates to a method of detecting the presence of software products on distributed data processing system. In particular, the activity of signature generation is addressed by the present invention. The invention further relates to a computer program for performing the method and to a product embodying the program. Moreover, the invention also relates to a corresponding apparatus.

BACKGROUND

Several system management software applications require the availability of a comprehensive knowledge base that contains information on software products, which may be currently installed and running on a plurality of data processing systems. For example, license manager products like IBM Tivoli License Manager (ITLM) needs a knowledge base (i.e. a catalogue) to identify the products found on the managed systems and correctly metering and invoicing the use of such products. Normally this knowledge base is in the form of a catalogue which contains definitions of software products (e.g. product names and version) and the related signature. The software catalogue lists all the known products which can be found on the managed systems; each product can be identified by one or more executable modules indicative of its running. As an example, in the case of a License Manager product, a licensing agent working in the background detects the executable modules that have been launched; the licensing agent then identifies the corresponding products through the software catalogue.

One method largely employed today for obtaining an inventory of software installed on a computer system is to run an inventory application that tries to match pre-defined signatures against the results of scanning some known registries, the file systems or a combination of both. Creating a signature to be employed in the above process often requires an in-depth knowledge of the product to be discovered. Indeed, relying on a registry signature may cause false positives (e.g. when the un-install of the software product has left orphaned information in the registry). A file signature specifying both the name and size of a key product executable would rarely produce false positives. However, it can easily generate false negatives because of factors that may either change the file size (updates) or make it unpredictable (file is built by statically linking pre-requisite libraries which have different sizes depending on their version).

Product signatures that specify the size (or checksum) and name of a key file do not produce false positives, but there is a high cost for keeping the product signature catalogue (or Knowledge Base) up to date with changes that are introduced in the size or checksum of that file by each new product upgrade and patch. In practice, there must be one signature in the catalogue for each variant of the signature file that has been deployed in the field.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is one aspect of the present invention to provide a method of generating a product signature, wherein the product signature is indicative of the presence of an associated software product with respect to a plurality of data processing systems, the method including the steps of: scanning the file systems of the plurality of data processing system for detecting the occurrence of sets of files, each of the sets being indicative of a product being installed on a data processing system; for each of the sets, collecting at least one element of registry information; determining a corresponding product signature being associated to a software product, the signature including a file-based portion being indicative of the set of files and a registry-based portion being indicative of the at least one element of registry information.

Another aspect of the present invention provides a method for discovering software products across a plurality of data processing system.

A further aspect of the present invention provides a computer program for performing the above-described method.

A still further aspect of the invention provides a program product embodying this program.

Moreover, another aspect of the invention provides a corresponding apparatus for implementing the above method.

According to a preferred embodiment of the present invention, a method is provided for specifying a signature—for a software product—which does not need to be updated to reflect changes induced by software updates and fixes that are released for that product. The key is to exploit the presence of some relevant files—identified only by their names and their relative paths with respect to a common installation folder—as an indicator that an instance of the product is installed on the scanned system. Alone, this information is not sufficient to determine the version of a detected instance because files with the same names could be common across different releases of the product. Therefore, the version of an instance is derived from the value of registry data associated to that instance.

In a preferred embodiment of the present invention, the generation of a signature requires an identification of a core set of files that are always part of a product instance regardless of options that were specified during installation. This identification is based on the automated analysis of information harvested from a representative sample of computers where the software product was installed. According to the present invention, a single signature can detect instances of the same product that correspond to different versions or releases. Therefore, one signature of the proposed type is generally associated in the software knowledge base to several product-version definitions. In a preferred embodiment of the present invention, the product version corresponding to a specific instance being detected is obtained from a specified registry key whose value needs to be obtained on the scanned computer. The absolute pathname (location) of the common installation folder—respect to which all relative paths of the signature files are specified—is also generally available from registry data associated to the same product instance. In that case, the process of searching a matching instance would be "immediate", as it would not require a full scan of the file-system, but only a verification that a set of files with the specified names and relative paths does indeed exist under that location.

Some products may not require that their version and install path information be registered on the platform software registry in order to be runnable. When searching a non registered software instance with the proposed signature, the file-based part of the signature specification can be still matched based on data from a full scan of the file-system (i.e. only the "immediateness" feature of the signature is lost). In that case, the signature would not return a value for the version of the detected instance, so one can only determine the range of possible values for this property based on the associated product-version definitions in the software knowledge base.

The novel features believed to be characteristic of this invention are set forth in the appended claims. The invention itself, however, as well as these and other related objects and advantages thereof, will be best understood by reference to the following detailed description to be read in conjunction with the accompanying drawings.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

The invention itself, as well as further features and the advantages thereof will be best understood with reference to the following detailed description, given purely by way of a non-restrictive indication, to be read in conjunction with the accompanying drawings, in which.

DETAILED DESCRIPTION

The particular values and configurations discussed in these non-limiting examples can be varied and are cited merely to illustrate at least one embodiment and are not intended to limit the scope of such embodiments.

Figure 1:
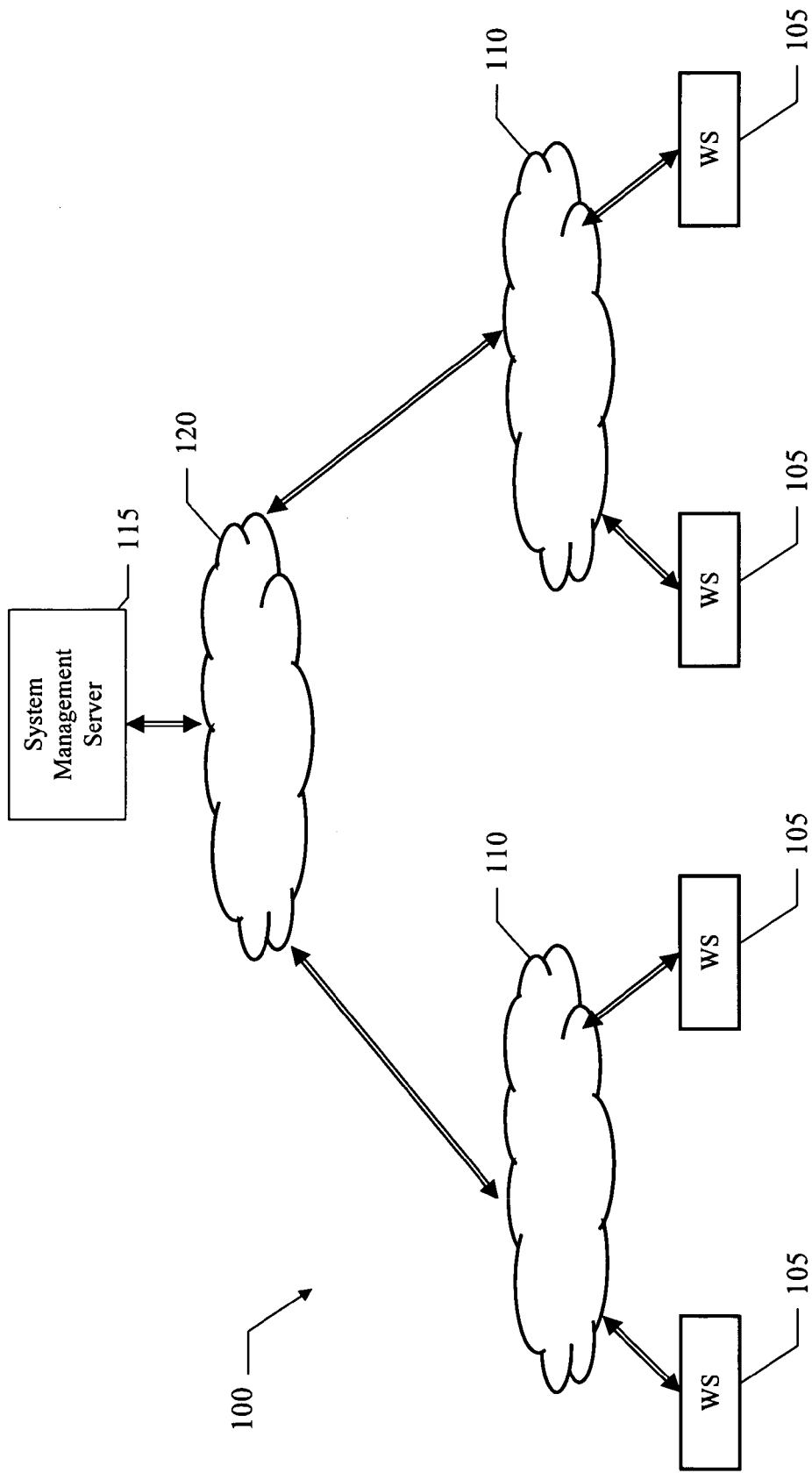
FIG. 1 illustrates a schematic block diagram of a data processing system in which the method of the invention is applicable.

With reference in particular to FIG. 1, a data processing system 100 with distributed architecture implementing a Software Inventory system, is depicted. The system 100 includes multiple endpoints 105, which are grouped into different sets. The endpoints 105 can be workstations, servers, laptops and, more generally, any kind of data processing system where a plurality of software products is installed. The endpoints 105 are connected to each other through a network 110 (for example, a LAN). The different sets of endpoints 105 communicate with a system management server 115 through a network 120 (for example, INTERNET-based); the system management server 115 implements a central repository where inventory data of the system 100 is collected and managed. As mentioned above, the present invention may be implemented in a license management system, but more generally in any system requiring an inventory activity, e.g. a software deployment system which needs to distribute fixes or enhancements to a plurality of workstation, after having inventoried the current status of each workstation; another possible use is within a configuration management system.

Figure 2:
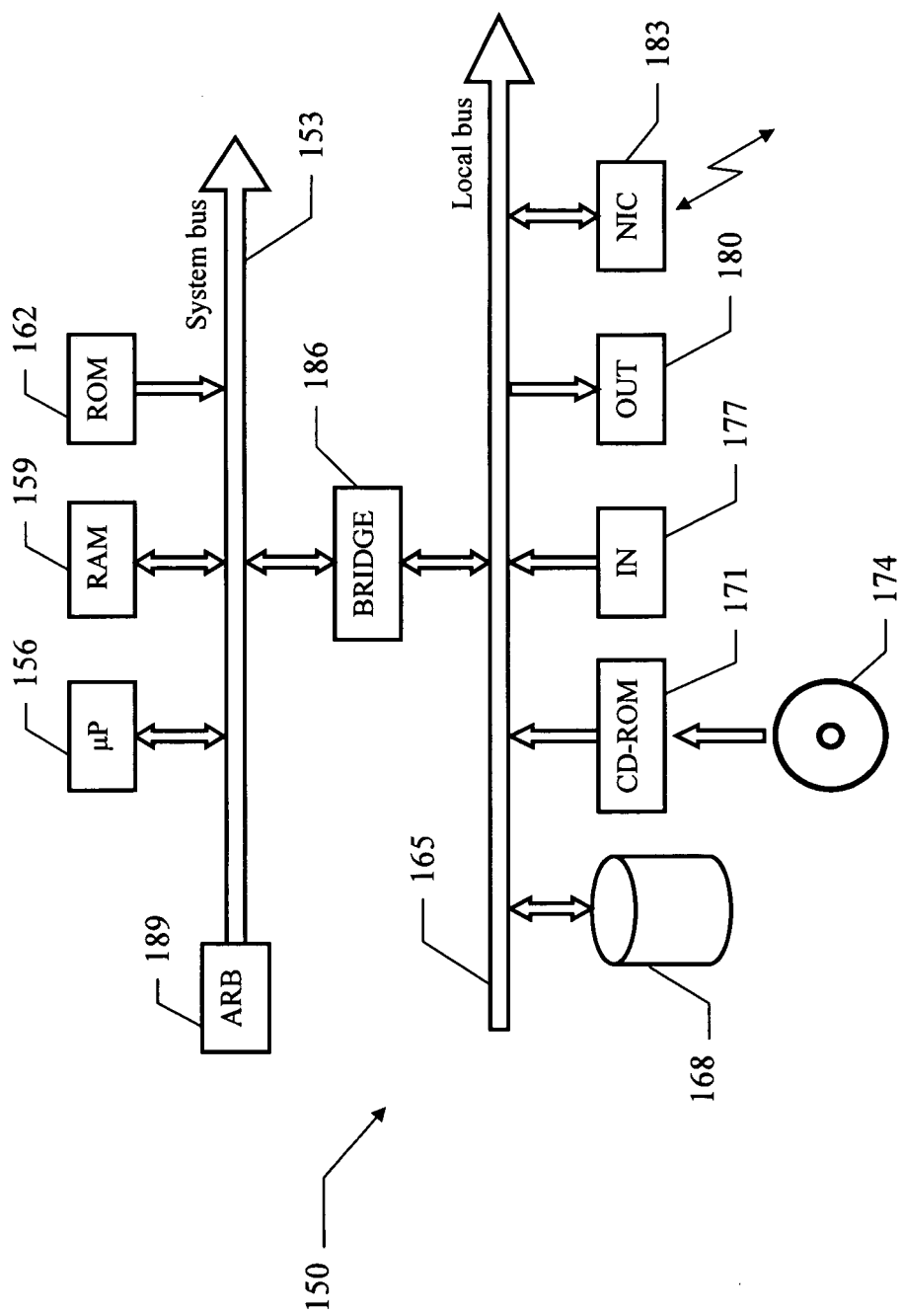
FIG. 2 illustrates the functional blocks of a generic computer of the system.

As depicted in FIG. 2, a generic computer of the system (workstation, local server, or system management server) is denoted with reference numeral 150. The computer 150 is formed by several units that are connected in parallel to a system bus 153. In detail, one or more microprocessors ($\mu P$) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on other networks. Alternatively, the computers have a different structure, include equivalent units, or consist of other data processing entities (such as PDAs, mobile phones, and the like). In any case, the solution of the invention is also suitable to be used in a system wherein the control of the workstations is decentralized, or even in a stand-alone computer.

Figure 3:
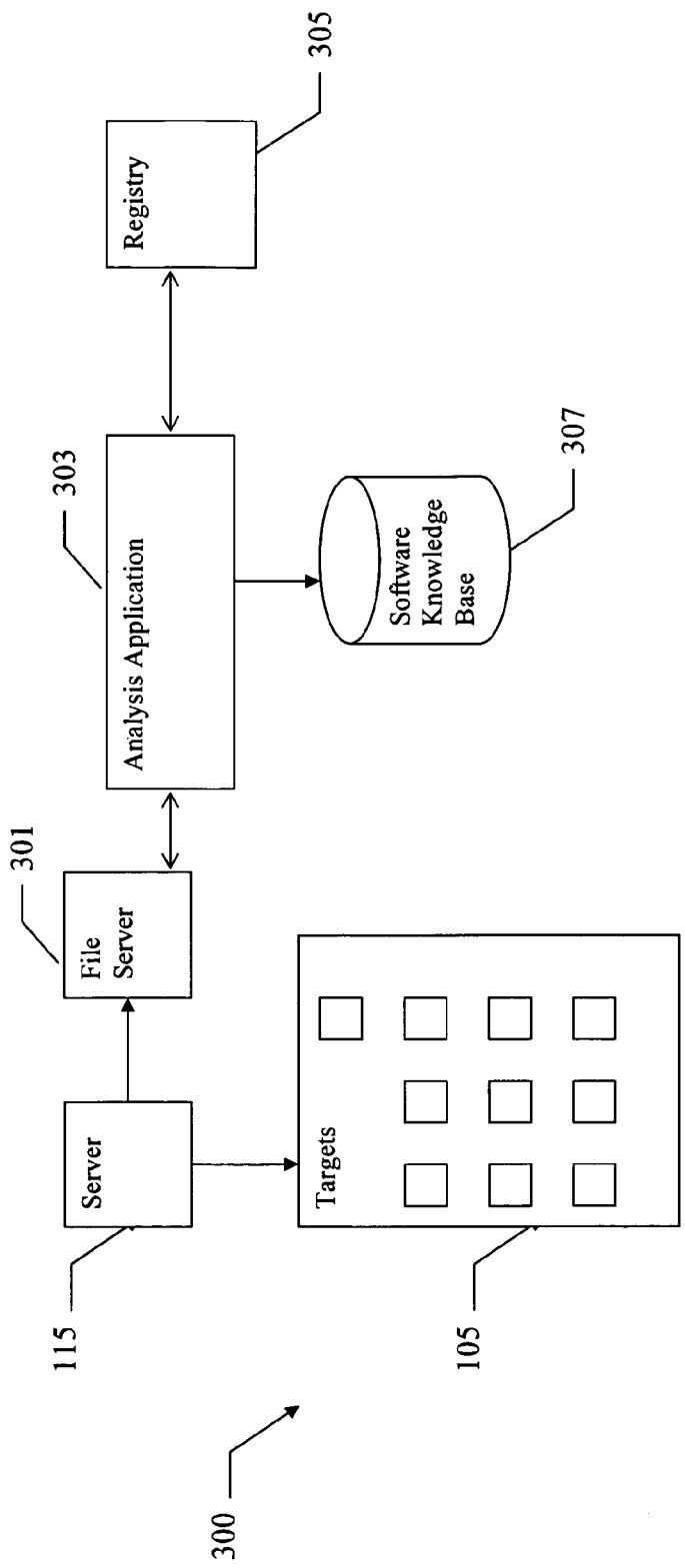
FIG. 3 illustrates the main components that can be used for practicing the method.

Considering now FIG. 3, the main components that can be used to practice the method of a preferred embodiment of the invention are denoted as a whole with 300. The information (programs and data) is typically stored on the hard-disks of the different computers and loaded (at least partially) into the corresponding working memories when the programs are running.

A System Management Server 115 controls and executes management operations on several endpoints 105, connected by a communication network. The set of endpoints 105 includes servers, workstations, desktops or laptops, whose installed software is analyzed with the objective of enlarging the available base of product definitions and related signatures.

The Systems Management Server 115 controls management operations on a potentially large set of interconnected endpoints 105, thus avoiding the need of physically visiting each computer. This server and the underlying systems management infrastructure are used for performing a scanning operation on the managed computers with the goal of collecting raw data needed by the analysis application; and for moving data generated locally by the scanners to a central file-server 301, where these data can be stored on the server's file system. The scanning operation may be performed on all managed endpoints 105 or on a specific subset, the latter being possibly determined by their role (servers, workstations, desktops or laptops) or by the running operating system.

According to a preferred embodiment of the present invention, the above data gathering method is implemented by using IBM Software Signature Analyzer Tool; it is, however, understood by those skilled in the art that other methods, producing similar results could be used instead. The present invention aims at using the gathered information to produce a robust signature which avoids the drawback of the prior art. As explained above, a robust signature does not need to be updated to reflect changes induced by software updates and fixes that are released for the associated product, while it still avoids both "false positives" and "false negatives". The data harvested from the selected computers are stored in the filesystem of the central file-server, from which the data can be accessed by the Analysis Application 303. Analysis Application 303 implements the data transformation and the analysis leading to the creation of new product definitions and related signatures.

Analysis application 303 supports the identification of footprints (groups of files) that are representative of an installed instance of a software product. Each footprint needs to be correlated to a product definition which can be often derived automatically from harvested data or that can be generated by the application with input from the user. The Analysis Application 303 combines the data gathered as explained above with registry information contained in Operating System Registry 305. This combined product definition and a related signature is then generated and stored in the Software Knowledge Base 307. A Software Knowledge Base 307 is a database holding a set of consolidated product definitions and signatures. The database can be initially empty or it can be populated with data created by a provider of software signatures. The new definitions produced by the analysis application are consolidated in this database.

A signature definition is generated based on the available information, which includes file information and registry information. In a first phase of the process, the file-based part of the signature is constructed. The file names and their paths relative to a common parent folder are obtained from the content of the re-constructed footprints of a product, each footprint representing a folder of the product installation tree from which optional files have been filtered out. The product install tree generally consists of multiple folders under a common root; therefore, it can be represented by a group of several footprints. Sometimes the presence of an entire folder in the product tree may be optional. This would be revealed by a lower number of instances with respect to its parent folder; therefore, footprints corresponding to an optional folder are eliminated. This process produces the identification of a set of "core" files for a given version-release level of a product.

By comparing the content of footprints that correspond to the same version and different release levels of the same product, files whose name appears in all the corresponding footprints can be deemed suitable to identify an installed instance of that version, regardless of the release level. Ideally, one would try to build a single signature covering all possible release levels. However, it may happen that the files common to any release are only a small fraction of the total, in which case it may be necessary to create two or more homogeneous groups of files spanning a subset of releases. Another reason for splitting would be in case that going from one release to another release, a given footprint has a different location within the install tree, so that relative paths cannot be uniquely assigned to its files for all the releases.

In a second phase of the process, the registry-based part of the signature is constructed. The harvested information includes registry data related to installed products and correlated to the file information. The way that registry data can be associated to product file information depends on the characteristics of the operating system running on the harvested computer. That association is easily implemented on most UNIX operating systems, where the platform registry supports queries about the files associated to a registered product. On other platforms, it is common that an application registers vital properties of each instance, like the install location and version, in a platform registry. Unfortunately, these platforms do not provide a standard form of querying the registry about the files associated to a product. However, the harvested information may include data from other sources, namely a registry entry created by the software installer within an installer specific registry.

If the installation path is part of the information registered by the installer, the registry entry can be correlated to the corresponding installed instance. Alternatively, if no suitable registry source was correlated to the installed instance in the harvested data, the registry information might be inputted by the user. In either case, the signature information created in this phase must be sufficient to support a query of the specified software registry—implemented by the signature evaluator—that returns the version of an installed instance. The registry-based part of the signature also includes the specification of a registry query that returns the install location of an installed instance. The presence of this information allows the evaluator to perform an "immediate" verification of the file-based part of the signature without requiring a full scan of the file-system.

Figure 4:
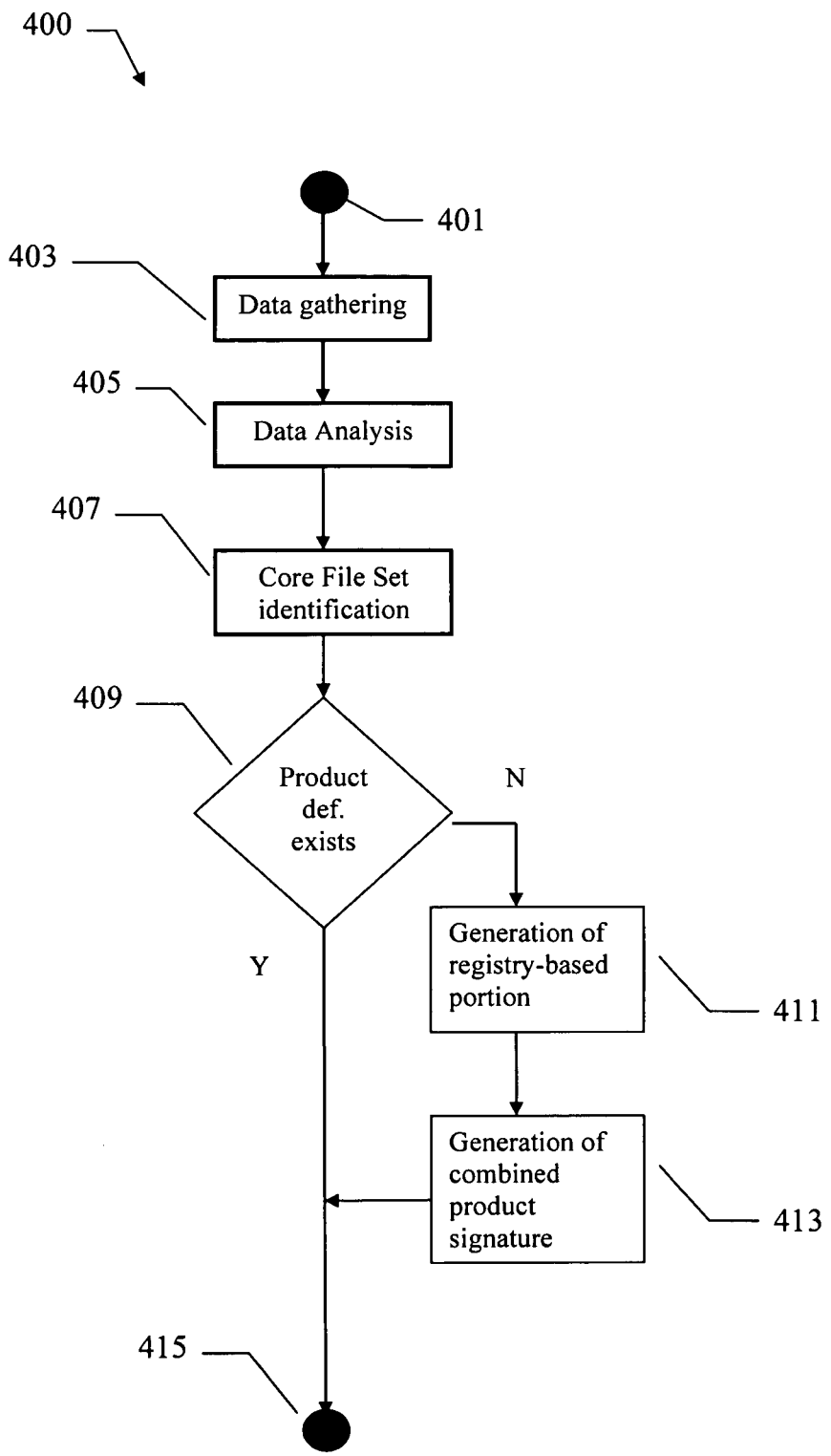
FIG. 4 illustrates a diagram describing the flow of activities relating to an illustrative implementation of the method.

Considering now FIG. 4, the logic flow of generating a product signature according to an embodiment of the invention is represented with a method 400. The method begins as indicated by the black start circle 401 depicted in FIG. 4. As illustrated next at block 403, data can be gathered throughout the endpoints 105. Obtained data can be then analyzed as illustrated at block 405 and a core file set is identified as depicted at block 407. This core set is generally representative of a related software product. Unless a product definition already exists (i.e., see block 409), a registry-based information is obtained (i.e., see block 411) and combined to the file-based information (i.e., the core set obtained above) for the generation of a product signature (i.e., see block 413). The process ends as indicated by the black circle 415 illustrated in FIG. 4.

Similar considerations apply if programs and data are structured in a different manner, if other modules or functions are provided, or if the information is stored in equivalent memory structures. Similar considerations apply if the method includes equivalent or additional steps. Alternatively, for example different methods of obtaining the information on the inspected endpoints can be used, depending also on the operating system on which the system is installed.

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention.

In any case, the method of the invention can be used for discovering, inventorying or metering any kind of software products (such as video games, multimedia works, and the like). In addition, the programs can be distributed on any other computer readable medium (such as one or more DVDS); alternatively, the programs are pre-loaded onto the hard-disks, are transmitted to the computers, are broadcast, or more generally are provided in any other form directly loadable into the working memories of the computers.

Moreover, it will be apparent to those skilled in the art that the additional features providing further advantages are not essential for carrying out the invention, and may be omitted or replaced with different features. In any case, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

In any case, the solution according to the present invention lends itself to be carried out with a hardware structure (e.g., integrated in a chip of semiconductor material), or with a combination of software and hardware.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for generating a product signature, and using the product signature to detect presence of an associated software product on file systems of a plurality of data processing systems, said method comprising:
    scanning the file systems of the plurality of data processing systems to detect occurrences of sets of files, each of the sets being indicative of one or more versions of said product installed on a data processing system;
    for each of the sets, collecting at least one element of registry information for use in verifying each of said sets;
    determining a corresponding product signature being associated to a software product, the signature including a file-based portion indicative of the set of files and a registry-based portion being indicative of at least one element of registry information, said registry-based portion including a value of at least one predefined registry key associated with a version among said one or more versions of the product installed on the data processing system;
    determining the value of said at least one predefined registry key; and
    in response to detecting each of the sets, using said value of said at least one predefined registry key to verify the file-based portion of each of said sets and determine the version of the product based on the value of said at least one predefined registry key;
    wherein scanning the file systems of the plurality of data processing systems for detecting the occurrence, further comprises:
    identifying a plurality of executable files on the plurality of data processing systems;
    creating a list containing the plurality of identified executable files;
    selecting at least one file on the list; and
    for each selected file, creating a footprint set that identifies files installed as part of said software product, the footprint set including the files which occur in all folders containing the selected file;
    wherein the file-based portion includes said footprint set.

2. The method of claim 1, wherein at least one element of registry information is derived from at least one of the files of the corresponding set of files; and
    wherein the determining of the corresponding product signature associated to the software product comprises generating said product signature.

3. The method of claim 1 further comprising:
    sorting the list according to the number of occurrences of each file;
    starting from the file with the highest occurrence selecting one file on the list until the list has been scanned, and for each selected file:
    creating a footprint set including the files which occur in all the folder containing the selected file; and
    deleting from the sorted list all the files included in the footprint.

4. The method of claim 1 wherein the file-based portion of the product signature includes the file names of the set of files and the path relative to a common parent folder; and
    wherein the file-based portion is associated with a version said one or more versions of the product installed on the data processing system.

5. The method of claim 1 wherein collecting at least one element of registry information includes querying the operating system registry according to at least one of the files of the corresponding set of files.

6. The method of claim 1 wherein the association of the signature with a software product identifier is based on information extracted by the files included in the corresponding set of files.

7. The method of claim 1, wherein said set of files is associated with a plurality of said one or more versions of said product.

8. A system for generating a product signature, the product signature being indicative of the presence of an associated software product on a plurality of data processing systems, said system comprising:
    a processor;
    a data bus coupled to said processor; and
    a computer-usable medium embodying computer code, said computer-usable medium being coupled to said data bus, said computer program code comprising instructions executable by said processor and configured for:
    scanning the file systems of the plurality of data processing systems for detecting occurrences of sets of files, each of the sets being indicative of one or more versions of said product installed on a data processing system;
    for each of the sets, collecting at least one element of registry information for use in verifying each of said sets;
    determining a corresponding product signature being associated to a software product, the signature including a file-based portion indicative of the set of files and a registry-based portion being indicative of at least one element of registry information, said registry-based portion including a value of at least one predefined registry key associated with a version among said one or more versions of the product installed on the data processing system;
    determining the value of said at least one predefined registry key; and
    in response to detecting each of the sets, using said value of said at least one predefined registry key to verify the file-based portion of each of said sets and determine the version of the product based on the value of said at least one predefined registry key;
wherein said instructions are further configured for:
identifying a plurality of executable files on the plurality of data processing systems;
creating a list containing the plurality of identified executable files;
selecting at least one file on the list; and
for each selected file, creating a footprint set that identifies files installed as part of said software product, the footprint set including the files which occur in all folders containing the selected file;
wherein the file-based portion includes said footprint set.

9. The system of claim 8, wherein at least one element of registry information is derived from at least one of the files of the corresponding set of files; and
wherein the determining of the corresponding product signature associated to the software product comprises generating said product signature.

10. The system of claim 8 wherein said instruction are further configured for:
sorting the list according to the number of occurrences of each file;
starting from the file with the highest occurrence selecting one file on the list until the list has been scanned, and for each selected file:
creating a footprint set including the files which occur in all the folder containing the selected file; and
deleting from the sorted list all the files included in the footprint.

11. The system of claim 8 wherein the file-based portion of the product signature includes the file names of the set of files and the path relative to a common parent folder; and
wherein the file-based portion is associated with said one or more versions of the product installed on the data processing system.

12. The system of claim 8 wherein collecting at least one element of registry information includes querying the operation system registry according to at least one of the files of the corresponding set of files.

13. The system of claim 8 wherein the association of the signature with a software product identifier is based on information extracted by the files included in the corresponding set of files.

14. The system of claim 8, wherein said set of files is associated with a plurality of said one or more versions of said product.

15. A non-transitory computer-usable medium for generating a product signature, the product signature being indicative of the presence of an associated software product on a plurality of data processing systems, said computer-usable medium embodying computer program code, said computer program code comprising computer executable instructions configured for:
scanning the file systems of the plurality of data processing systems for detecting occurrences of sets of files, each of the sets being indicative of one or more versions of said product installed on a data processing system;
for each of the sets, collecting at least one element of registry information for use in verifying each of said sets;
determining a corresponding product signature being associated to a software product, the signature including a file-based portion indicative of the set of files and a registry-based portion being indicative of at least one element of registry information, said registry-based portion including a value of at least one predefined registry key associated with a version among said one or more versions of the product installed on the data processing system;
determining the value of said at least one predefined registry key; and
in response to detecting each of the sets, using said value of said at least one predefined registry key to verify the file-based portion of each of said sets and determine the version of the product based on the value of said at least one predefined registry key;
wherein scanning the file systems of the plurality of data processing systems for detecting the occurrence, further comprises:
identifying a plurality of executable files on the plurality of data processing systems;
creating a list containing the plurality of identified executable files;
selecting at least one file on the list; and
for each selected file, creating a footprint set that identifies files installed as part of said software product, the footprint set including the files which occur in all folders containing the selected file;
wherein the file-based portion includes said footprint set.

16. The computer-usable medium of claim 15, wherein at least one element of registry information is derived from at least one of the files of the corresponding set of files; and
wherein the determining of the corresponding product signature associated to the software product comprises generating said product signature.

17. The computer-usable medium of claim 15 wherein said embodied computer program code further comprises computer executable instructions configured for:
sorting the list according to the number of occurrences of each file;
starting from the file with the highest occurrence selecting one file on the list until the list has been scanned, and for each selected file:
creating a footprint set including the files which occur in all the folder containing the selected file; and
deleting from the sorted list all the files included in the footprint.

18. The computer-usable medium of claim 15, wherein the file-based portion of the product signature includes the file names of the set of files and the path relative to a common parent folder; and
wherein the file-based portion is associated with said one or more versions of the product installed on the data processing system.

19. The computer-usable medium of claim 16, wherein collecting at least one element of registry information includes querying the operating system registry according to at least one of the files of the corresponding set of files.

20. The computer-usable medium of claim 15, wherein said set of files is associated with a plurality of said one or more versions of said product.

* * * * *